(12) United States Patent
Hovel et al.

(10) Patent No.: US 9,809,088 B2
(45) Date of Patent: Nov. 7, 2017

(54) CONTROLLING HVAC SPEED OF CONDENSER FANS USING PRESSURE SENSORS

(71) Applicant: Caterpillar Inc., Peoria, IL (US)

(72) Inventors: Douglas J. Hovel, Lincoln, IL (US);
Erick A. Njos, Washington, IL (US);
Daniel A. Spurgeon, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1189 days.

(21) Appl. No.: 13/912,759

(22) Filed: Jun. 7, 2013

(65) Prior Publication Data

US 2014/0360211 A1 Dec. 11, 2014

(51) Int. Cl.
*F25B 49/00* (2006.01)
*B60H 1/32* (2006.01)
*B60H 1/00* (2006.01)

(52) U.S. Cl.
CPC ....... *B60H 1/3205* (2013.01); *B60H 1/00828* (2013.01); *B60H 2001/3277* (2013.01)

(58) Field of Classification Search
CPC .............. B60H 1/3205; B60H 1/00828; B60H 2001/3277
See application file for complete search history.

(56) References Cited

U.S. PATENT DOCUMENTS

| | | | |
|---|---|---|---|
| 3,682,240 A * | 8/1972 | Cira | B60H 1/00378 165/104.31 |
| 4,192,456 A * | 3/1980 | Shields | B66C 13/54 122/26 |
| 4,352,456 A * | 10/1982 | Brandenburg, Jr. | B60H 1/00378 122/26 |
| 5,289,692 A | 3/1994 | Campbell et al. | |
| 5,477,701 A | 12/1995 | Kenyon et al. | |
| 5,490,556 A * | 2/1996 | Pichotta | B60H 1/00828 165/255 |

(Continued)

FOREIGN PATENT DOCUMENTS

DE EP 1524137 A2 * 4/2005 ......... B60H 1/00828
KR 10 2011 0023392 3/2011

*Primary Examiner* — Ljiljana Ciric
(74) *Attorney, Agent, or Firm* — Miller, Matthias & Hull LLP; James S. Bennin

(57) ABSTRACT

A controller for a heat, ventilation, and air conditioning (HVAC) unit may comprise a compressor control signal output; a condenser fan control signal output; a pressure sensor input that receives information regarding an output pressure of the compressor; a temperature input that receives information regarding ambient temperature; a processor coupled to the compressor control signal output, the condenser fan control signal output, the first pressure sensor input, and the temperature input; and a computer-readable memory that stores instructions. The processor may cause the controller to: turn on the compressor via the compressor control signal output based on a request for air conditioning, select a condenser fan speed, from condenser fan control data stored in the computer readable memory, based on the ambient temperature and an output pressure of the compressor, and set a speed of the condenser fan to the selected condenser fan speed via the condenser fan control signal.

17 Claims, 8 Drawing Sheets

(56) References Cited

U.S. PATENT DOCUMENTS

| | | | |
|---|---|---|---|
| 5,522,231 A | 6/1996 | Kenyon et al. | |
| 5,538,472 A * | 7/1996 | Panoushek | B60H 1/00885 237/12.3 R |
| 5,761,918 A * | 6/1998 | Jackson | F25B 49/022 62/181 |
| 5,782,101 A | 7/1998 | Dennis | |
| 5,993,312 A * | 11/1999 | Panoushek | B60H 1/00378 237/12.3 R |
| 6,321,549 B1 * | 11/2001 | Reason | B60H 1/00885 62/223 |
| 6,758,266 B1 * | 7/2004 | Sjunnesson | B60R 17/02 123/41.33 |
| 6,823,681 B2 * | 11/2004 | Hirose | B60H 1/3205 62/133 |
| 6,959,558 B2 | 11/2005 | Bean, Jr. et al. | |
| 7,287,582 B2 * | 10/2007 | Turner | B60H 1/3222 165/202 |
| 7,878,014 B2 | 2/2011 | Akehurst et al. | |
| 9,662,958 B2 * | 5/2017 | Hoshiya | B60H 1/00378 |
| 9,669,498 B2 * | 6/2017 | Pham | B23P 15/26 |
| 9,677,781 B2 * | 6/2017 | Breu | F01P 5/043 |
| 2001/0003904 A1 * | 6/2001 | Hamery | B60H 1/00764 62/133 |
| 2007/0277538 A1 * | 12/2007 | Buck | F25B 49/005 62/150 |
| 2008/0115512 A1 * | 5/2008 | Rizzo | B60H 1/00428 62/134 |
| 2010/0218527 A1 | 9/2010 | Kitagishi et al. | |
| 2012/0198865 A1 * | 8/2012 | Lockwood | B60H 1/3213 62/89 |

* cited by examiner

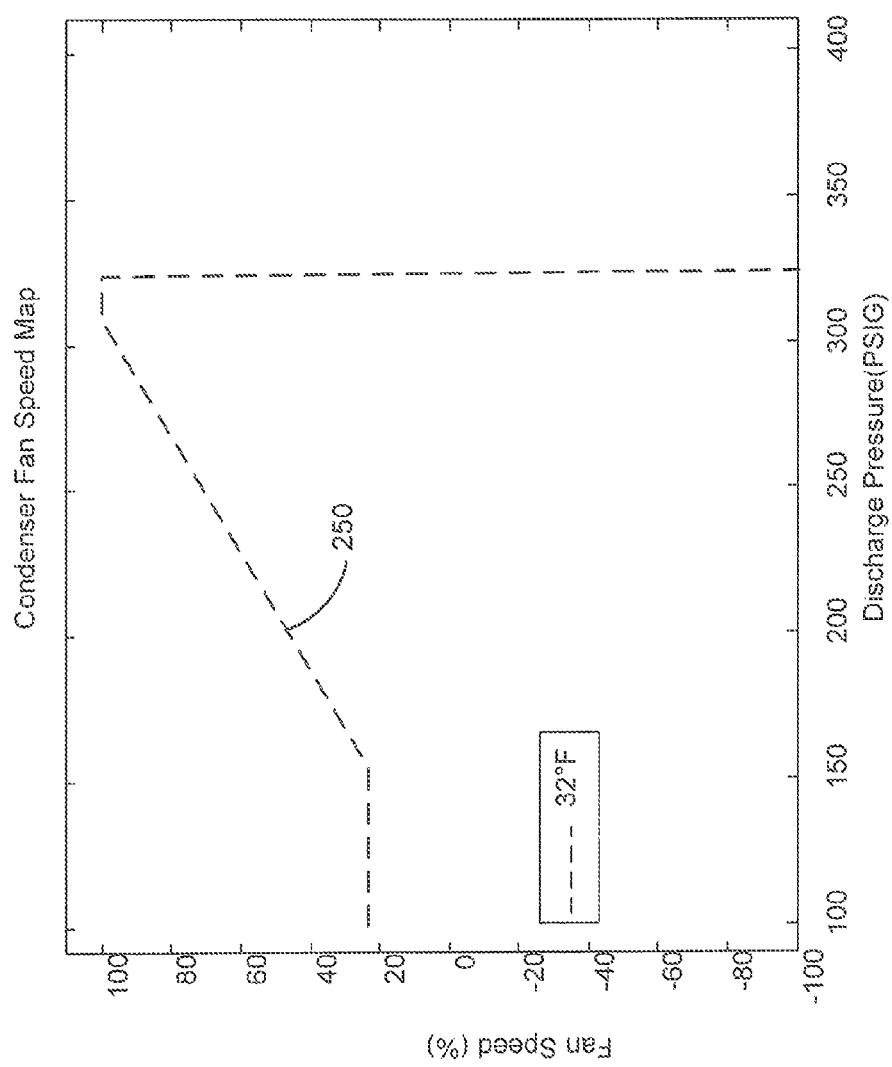

CONTROLLING HVAC SPEED OF CONDENSER FANS USING PRESSURE SENSORS

RELATED APPLICATION AND CLAIM OF PRIORITY

The present application is a continuation-in-part under 35 USC §120 of U.S. patent application Ser. No. 13/907,407 filed May 31, 2013 and claims further priority to U.S. Provisional Patent application 61/704,220 filed on Sep. 21, 2012, under 35 USC §119(e) both of which are hereby incorporated by reference for all purposes.

TECHNICAL FIELD

The present disclosure relates to operation of heat, ventilation, and air conditioning (HVAC) equipment. More particularly, the disclosure pertains to power saving during HVAC operation and identification of fault conditions as applied to earthmoving equipment.

BACKGROUND

A piece of heavy equipment, such as earthmoving equipment, is often operated in very adverse conditions, including dust or mud, extreme temperatures, high winds, etc. A heating, ventilating, and air conditioning (HVAC) unit must both operate in these conditions and protect itself from the hazards posed by these conditions.

However, diagnosis of problems such as clogged fans or low levels of refrigerant is difficult and the inability to diagnose such problems creates a risk of severe damage to expensive HVAC components such as the compressor.

U.S. Pat. No. 5,289,692 (the '692 patent) describes a heat transfer system that controls operation of a compressor, expansion valve, and whether a compressor fan is off or on based on the working fluid quality and high side fluid pressure. The '692 patent does not contemplate continuous control of the compressor fan speed while in a normal operating range or reversing the fan when the pressure increases beyond a limit.

SUMMARY OF THE DISCLOSURE

In a first embodiment, a method of operating a heat, ventilation, and air conditioning (HVAC) unit operated in an earthmoving machine senses an ambient temperate at the earthmoving machine, senses a compressor output pressure, and senses a compressor input pressure for use in determining operating and fault modes. During a time period when the compressor output pressure is in an operating pressure range, a speed of a condenser fan speed is controlled responsive to a combination of the ambient temperature and the compressor output pressure; and further operates the condenser fan in a reverse direction at maximum reverse speed responsive to the compressor output pressure being above the operating pressure range.

In a second embodiment, a controller for use in HVAC equipment operated in an earthmoving machine includes a compressor control signal output, a condenser fan control signal output, an alarm output, a first pressure sensor input that receives an output pressure of a compressor, a second pressure sensor input that receives a suction pressure between the evaporator and the compressor, and a temperature input that receives an ambient air temperature. The controller further includes a processor coupled to the compressor control signal output, the condenser fan control signal output, the alarm output, the first pressure sensor input, a second pressure sensor, and the temperature input, and a computer-readable memory that stores i) operating characteristics including condenser fan control data and ii) instructions. When executed by the processor, the instructions cause the controller to turn on the compressor via the compressor control signal output based on a request for air conditioning and an ambient temperature that is above a first threshold temperature, select a condenser fan speed from the condenser fan control data responsive to the ambient air temperature and the output pressure of the compressor, and set the condenser fan speed to the selected condenser fan speed via the condenser fan control signal. Subsequent to setting the condenser fan speed, the controller may send an alarm signal via the alarm output when the suction pressure is less than a threshold suction pressure level and the ambient temperature is above a second threshold temperature.

In another embodiment, an HVAC unit operated in an earthmoving machine may include a compressor that is selectively operable responsive to a compressor control signal, a condenser fluidly coupled to the compressor, an expansion valve fluidly coupled to the condenser, and an evaporator fluidly coupled to the expansion valve and the compressor. The HVAC unit may also include a first pressure sensor that measures output pressure of the compressor, a second pressure sensor that measures suction pressure between the evaporator and the compressor, an ambient temperature sensor, a condenser fan that provides cooling to the condenser, the condenser fan having variable speed and reversible direction responsive to a condenser fan control signal, and a controller electrically coupled to the first pressure sensor, the second pressure sensor, the ambient temperature sensor, and the fan, the controller configured to: i) provide the compressor control signal to selectively operate the compressor, and ii) provide the fan control signal. The controller may include a processor, a compressor control signal output, a condenser fan control signal output, a first pressure sensor input, a second pressure sensor input, an ambient temperature input, a computer-readable memory that stores instructions. When executed by the processor the instructions may cause the controller to turn on the compressor via the compressor control signal output based on a request for air conditioning and an ambient temperature is above a first threshold temperature, select a condenser fan speed from the condenser fan control data responsive to the ambient air temperature and the output pressure of the compressor, set the condenser fan speed to the selected condenser fan speed via the condenser fan control signal, and send an alarm signal via the alarm output when the suction pressure is less than a threshold suction pressure level and the current operating ambient temperature is above a second threshold temperature.

BRIEF DESCRIPTION OF THE DRAWINGS

FIG. 8 is another exemplary map of fan speed and direction to discharge pressure.

DETAILED DESCRIPTION

Figure 1:
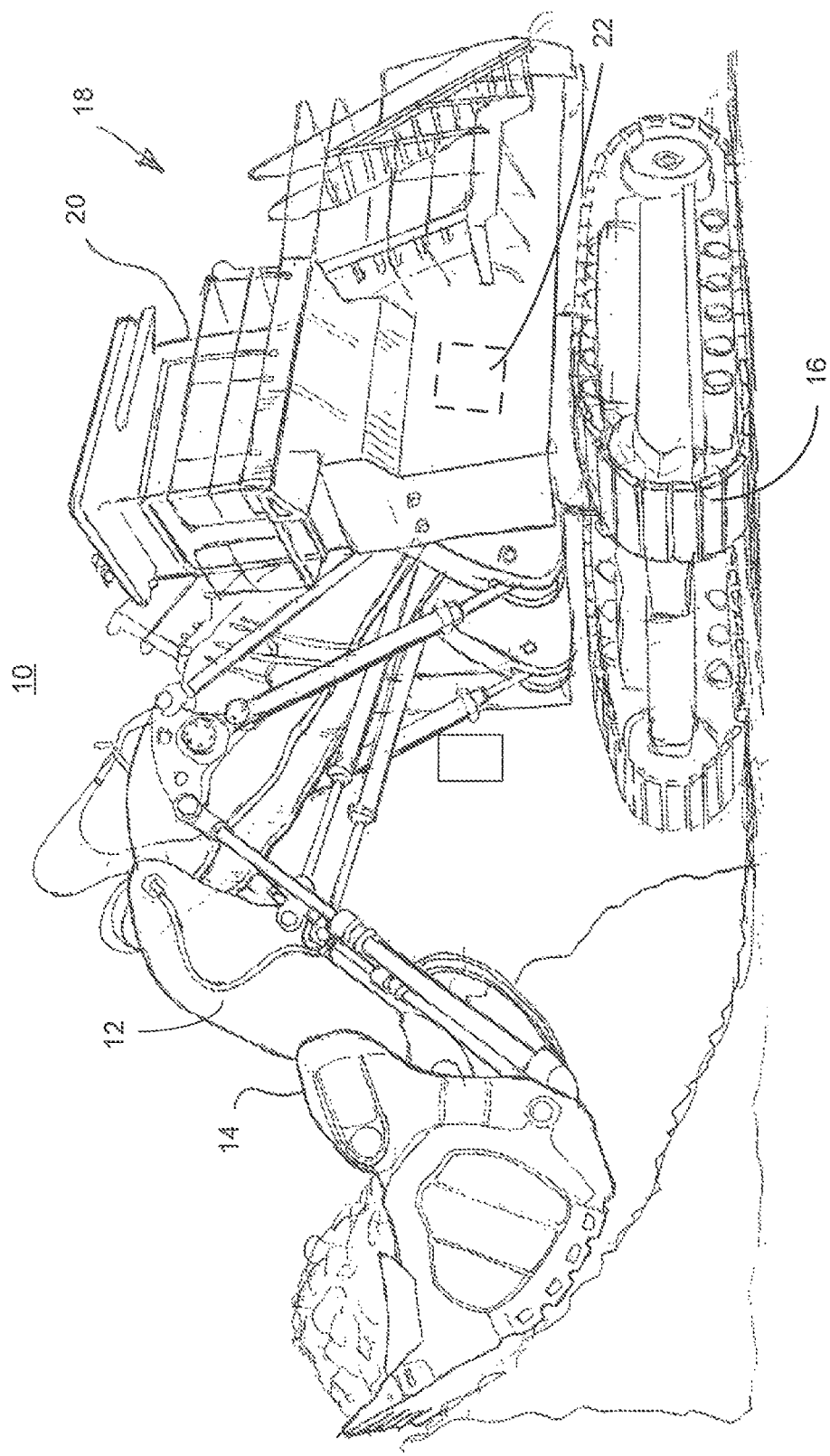
FIG. 1 is a view of a representative earthmoving machine including an HVAC unit.

FIG. 1 illustrates a representative earthmoving machine 10. The earthmoving machine 10 may include a hydraulically operated arm 12 and a bucket 14 for scooping and discharging payload. The earthmoving machine 10 main include tracks 16 for propelling the unit and an engine 18 that provides both electrical and mechanical power, a cab 20 for an operator, and an HVAC unit 22.

The earthmoving machine 10 may be any of a number of fixed or mobile machines, including, but not limited to, hydraulic shovels, dozers, mining, agriculture, off-road trucks, on-road trucks, etc. The HVAC unit 22, while presented in a mobile machine environment, may be used in virtually any HVAC environment including industrial, commercial, and residential units.

In operation, the HVAC unit 22 may provide cooling for operator comfort but may also provide low humidity air for use in removing or preventing fogging on the windows of the cab 20. In such cases, an air conditioning function of the HVAC unit may be operated even when ambient air temperatures are lower than those typically associated with air conditioning usage.

Figure 2:
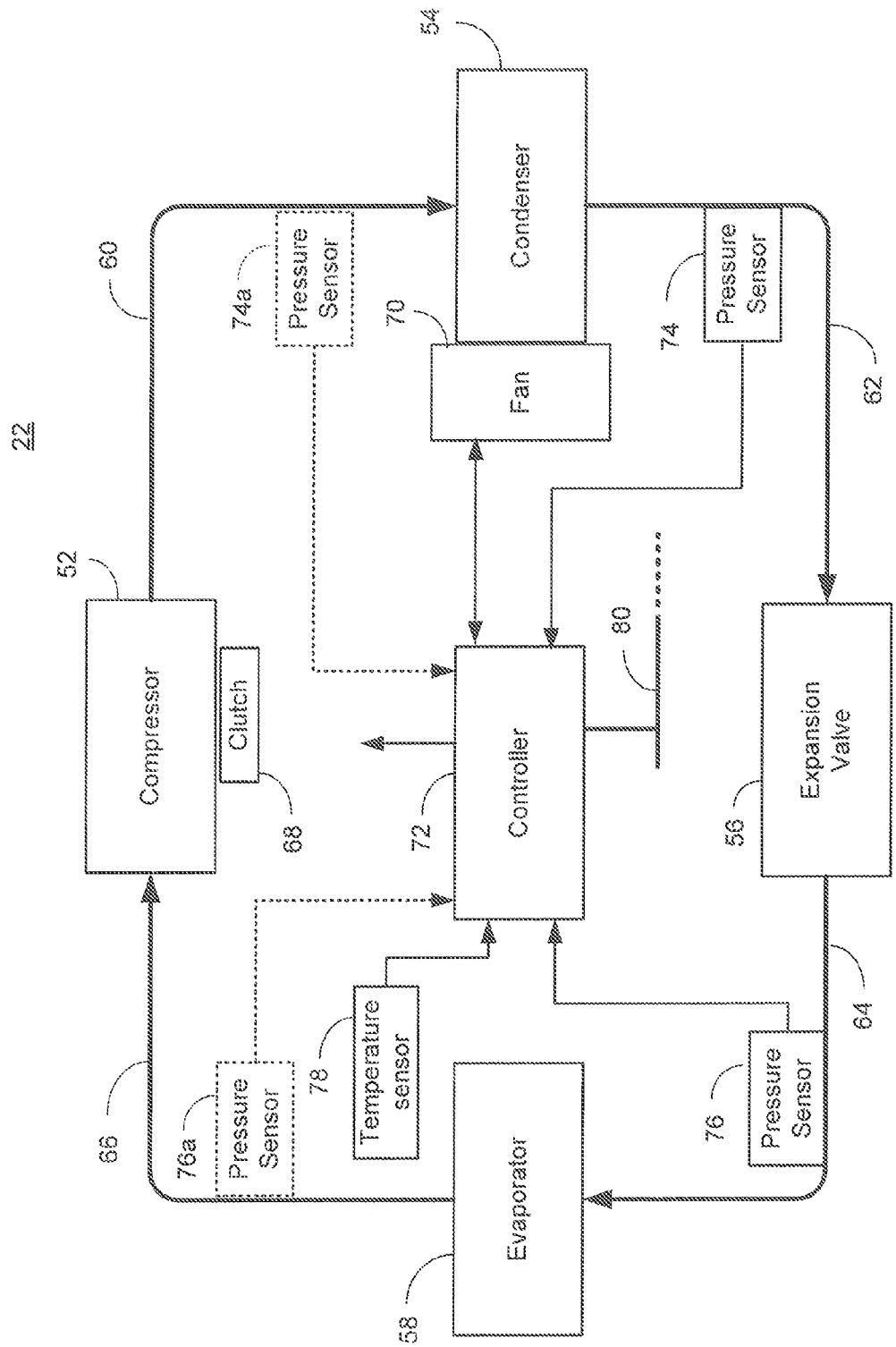
FIG. 2 a block diagram of an exemplary HVAC unit.

FIG. 2 illustrates an exemplary HVAC unit 22. HVAC unit 22 may include a compressor 52, a condenser 54, an expansion valve 56, and evaporator 58. Connecting these components are respective lines 60, 62, 64, and 66. These lines fluidly couple the compressor 52, condenser 54, expansion valve 56, and evaporator 58 and allow refrigerant in the form of liquid, gas, or a combination of liquid and gas, to flow between the elements as shown. A clutch 68 or similar device controls operation of the compressor 52. A condenser fan 70 provides cooling to the condenser 54 and, as described below, may be used to affect discharge pressure of the compressor 52. In an embodiment, a brushless direct current (BLDC) fan may be used instead of a more common alternating current (AC) fan. A BLDC fan allows continuous speed settings from full reverse to full forward. This provides a full range of control as discussed below with respect to FIG. 6 and FIG. 7. A DC brush-type fan embodiment may use a resistor block to provide a few discrete fan speeds.

A controller 72 receives inputs from a discharge pressure sensor 74 and a suction pressure sensor 76 as well having outputs that control the clutch 68 and the condenser fan 70.

Because in a standard refrigeration cycle the input and output of the condenser 54 are at a constant pressure, the pressure in lines 60 and 62 are generally equivalent. A pressure sensor 74, also referred to as a discharge pressure sensor, is shown coupled to line 62 but in an alternative embodiment, a pressure sensor 74a coupled to line 60 may be used instead of or in addition to the pressure sensor 74. Similarly, the inputs and outputs of the evaporator 58 are generally at a constant pressure and a pressure sensor 76, also referred to as a suction pressure sensor, may be used instead to read suction pressure. Similarly, in an alternative embodiment, a pressure sensor 76a on line 66 may be used instead of or in addition to pressure sensor 76.

A temperature sensor 78 may provide ambient temperature readings to the controller 72. In some embodiments, the condenser fan 70 may also provide feedback to the controller 72 as to the operational status of the fan, such as direction and speed. A network connection 80 may be used to connect the controller 72 to an external device such as an engine computer, a control panel, a dashboard, etc., and may be used to communicate inbound information such as requests for air conditioning and/or outbound information such as alarms.

In operation, the well-known refrigeration cycle involves the compressor 52 compressing a vapor phase refrigerant and the condenser 54 cooling the vapor to a liquid or vapor/liquid mix. The pressure at the output of the compressor 52 is a function of the amount of cooling provided by the condenser 54. In turn, the amount of cooling provided by the condenser 54 is a function of the condenser fan 70 and the ambient temperature. When the condenser fan 70 operates at maximum speed, heat transfer from the condenser 54 to the outside air is increased, which generally lowers the output pressure of the compressor 52. A condenser 54 typically has fins surrounding cooling coils (not depicted) that provide a large surface area for heat transfer. When the coils and/or fins are clean and unobstructed, airflow is optimized and improves cooling performance.

Several conditions may affect performance and efficiency of the HVAC unit 22. First, the condenser 54, particularly fin structures, may become obstructed with dust or other debris that both reduce airflow through the condenser 54 and provide an unwanted insulator that negatively affects the fin-to-air heat transfer. By sensing compressor output pressure, it is possible to adjust the fan speed to compensate for partially obstructed fins. That is, as the compressor output pressure builds, the fan speed can be increased to attempt to maintain a lower compressor output pressure. When fan speed is at a maximum and the compressor output pressure rises above a threshold limit, the compressor 52 may be stopped by disengaging the clutch 68 and the condenser fan 70 may be reversed in an attempt to blow out accumulated dust or debris.

Second, when operating in relatively low ambient temperatures, or other conditions when the cooling load is low, the condenser 54 may provide too much cooling that can cause icing of the evaporator 58 causing in rapid compressor cycling and increased wear resulting ultimately in premature failure. Another effect of icing is difficulty in effective control of the system. Further, running the condenser fan 70 at full speed regardless of cooling requirements wastes engine horsepower and increases operating costs. Third, in order for the compressor to operate correctly, the amount of refrigerant must be maintained above a minimum level. Operating with low refrigerant levels for even a relatively short period of time can cause a mechanical failure of the compressor 52 that is typically extremely expensive to repair. However, sensing low refrigerant levels is very difficult because the system pressures may be maintained even as refrigerant is lost. Similarly, sensing cooling efficiency changes is difficult because lower cooling efficiency due to loss of refrigerant may be masked by other conditions such as condenser dirt or debris. However, to overcome the difficulty of sensing refrigerant levels, evaluating a combination of ambient temperature and suction pressure at line 64 or 66 allows identification of low refrigerant levels, as discussed further below.

Also described further below, when the condenser fan 70 is an adjustable speed fan, ambient temperature measurements, and monitoring system pressures allows a control strategy that addresses reduced condenser efficiency due to dirt or debris, adjusts the compressor pressure to environmental requirements, and identifies low refrigerant conditions. The use of an adjustable speed fan allows continuous adjustment of the fan speed over its full operating range to meet the cooling requirements of the system. Such use may result in energy savings over systems where the condenser fan runs at full speed in all conditions. Not only does this save energy but may also help prevent conditions such as evaporator icing due to overcooling at low ambient temperatures.

Figure 3:
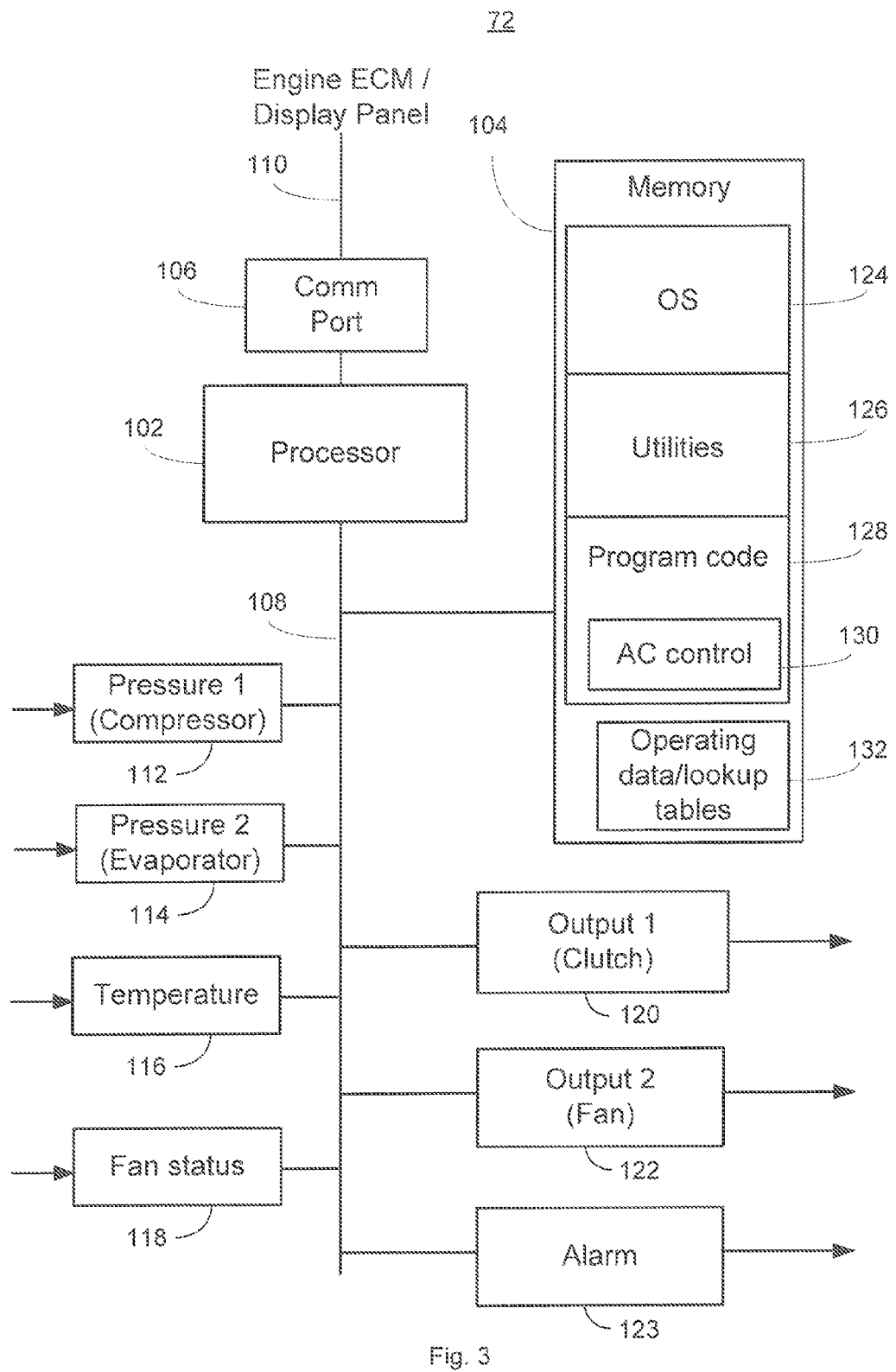
FIG. 3 is a block diagram of an exemplary HVAC controller.

FIG. 3 illustrates an exemplary HVAC controller 72 that may be the same as or similar to the controller 72 of FIG. 2. HVAC controller 72 may include a processor 102, a memory 104, a communication port 106, a processor bus 108, and an external network connection 110 coupled to the communication port 106. The external network connection 110 may be the same as or similar to the network connection 80 of FIG. 2.

The HVAC controller 72 may also include pressure sensor inputs 112, 114, an ambient temperature sensor input 116, and a fan status input 118. Pressure sensor input 112 may provide data to the HVAC controller 72 from a discharge pressure sensor 74 and pressure sensor input 114 may provide data from a suction pressure sensor 76. The HVAC controller 72 may also include one or more outputs, such as an output 120 that may be used to control the compressor clutch 68, another output 122 that may be used to control the fan 70, and an alarm output. In a brushless DC fan embodiment, the output 122 may be an analog output. The analog output may drive a separate DC voltage controller (not depicted) that physically drives the condenser fan 70. Other embodiments of providing variable level outputs to a BLDC fan may be supported, such as a register driven digital to analog converter, etc.

The memory 104 may include one or more kinds of physical volatile or nonvolatile computer-readable memory such as ROM, RAM, rotating media, flash memory, or other physical structures capable storing computer data readable by the processor 102, but does not include propagated media such as carrier waves. The memory 104 may include modules or functions that when executed by the processor 102 cause various software or hardware operations to be performed. For example, the memory 104 may include an operating system 124 and utilities 126, such as diagnostics or communication protocols. The memory 104 may also include program code 128 that may include one or more modules including an air-conditioning control module 130 as well as operating data and/or lookup tables 132 used by the air-conditioning control strategy as described in more detail below.

Figure 4:
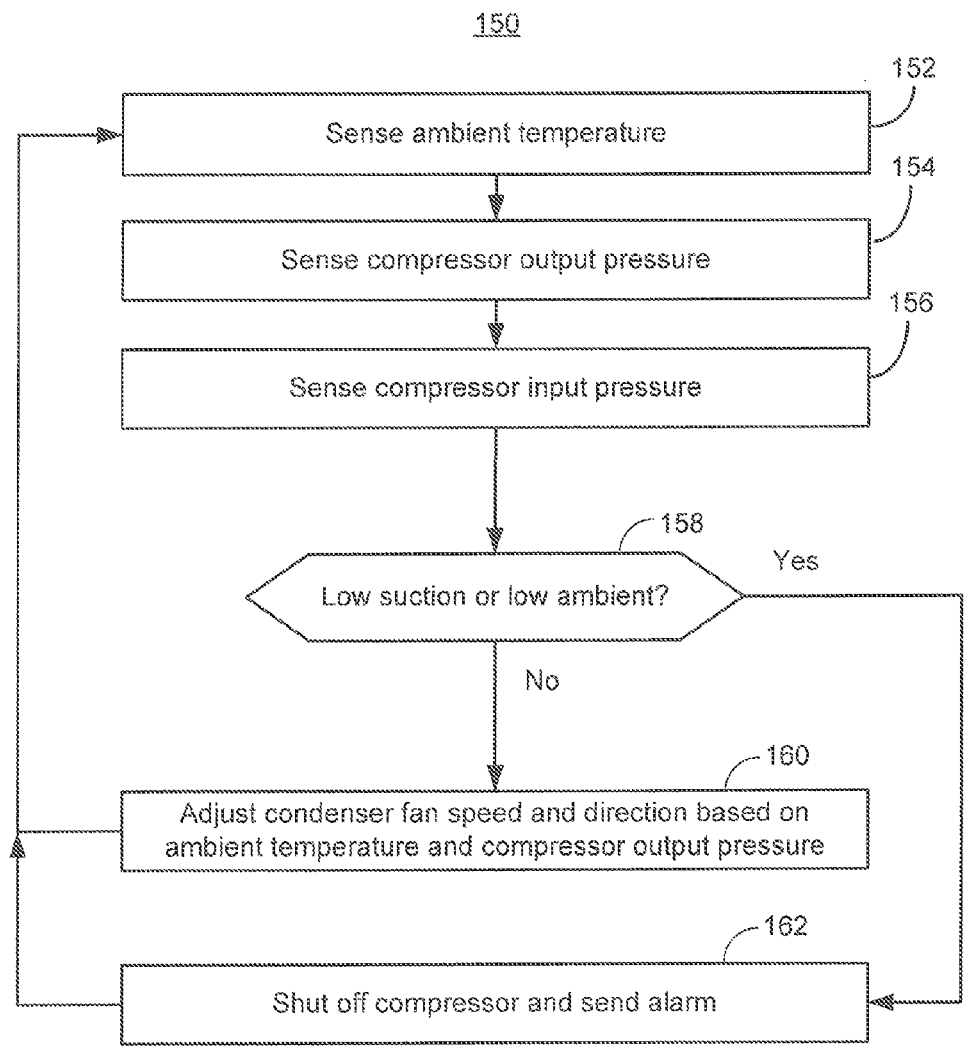
FIG. 4 is a flow chart of an exemplary method of high level operation of the HVAC unit.

FIG. 4 is a flow chart of a method 150 of operating an HVAC unit 22, particularly with respect to detection of and response to certain error conditions. At a block 152, an ambient temperature sensor 78 may provide an air temperature of the air surrounding the earthmoving machine 10 in which the HVAC unit 22 is installed. At a block 154, pressure at an output of the compressor 52 may be measured by a pressure sensor 74 and reported to the controller 72. As discussed above, even though pressure sensor 74 is coupled to line 62, a pressure sensor coupled to line 60 would be expected to perform the same function as pressure sensor 74. Similarly, at block 156, a pressure sensor 76 may report pressure at the input of the evaporator 58 and return that pressure to the controller 72. An equivalent pressure reading to that measured at line 64 would be expected at line 66 and may be used in some embodiments.

At a block 158, a determination of low suction may be performed both prior to starting the compressor 52 and during the operation of the compressor 52. Low suction, e.g., on line 64 or line 66, in combination with ambient temperature may be indicative of low refrigerant levels. Additionally, when the ambient temperature is low, for example, around freezing, the compressor 52 may be disabled to avoid competition with a heating unit (not depicted). The discussion below with respect to FIG. 5 discusses the low suction determination. If there is no indication of low suction at block 158 the "no" branch may be taken from block 158 to block 160. At block 160, the ambient temperature and compressor output pressure measured at pressure sensor 74 may be used to determine a condenser fan speed and direction. Condenser fan speed and direction are discussed in more detail with respect to FIG. 6 and FIG. 7 below. Following execution at block 160, an HVAC control strategy may continue at block 152 and repeat the above process. If, at block 158, a low suction determination is made the "yes" branch from block 158 may be taken to block 162.

At block 162, an alarm condition may be raised and an appropriate response taken. The response may include shutting off the compressor, lighting an indicator on a control panel, sending a message to an external service monitoring facility, etc. As discussed above, low refrigerant level is a significant source of damage in compressors and shutting down the compressor after such a fault is indicated may result in substantial cost savings.

Figure 5:
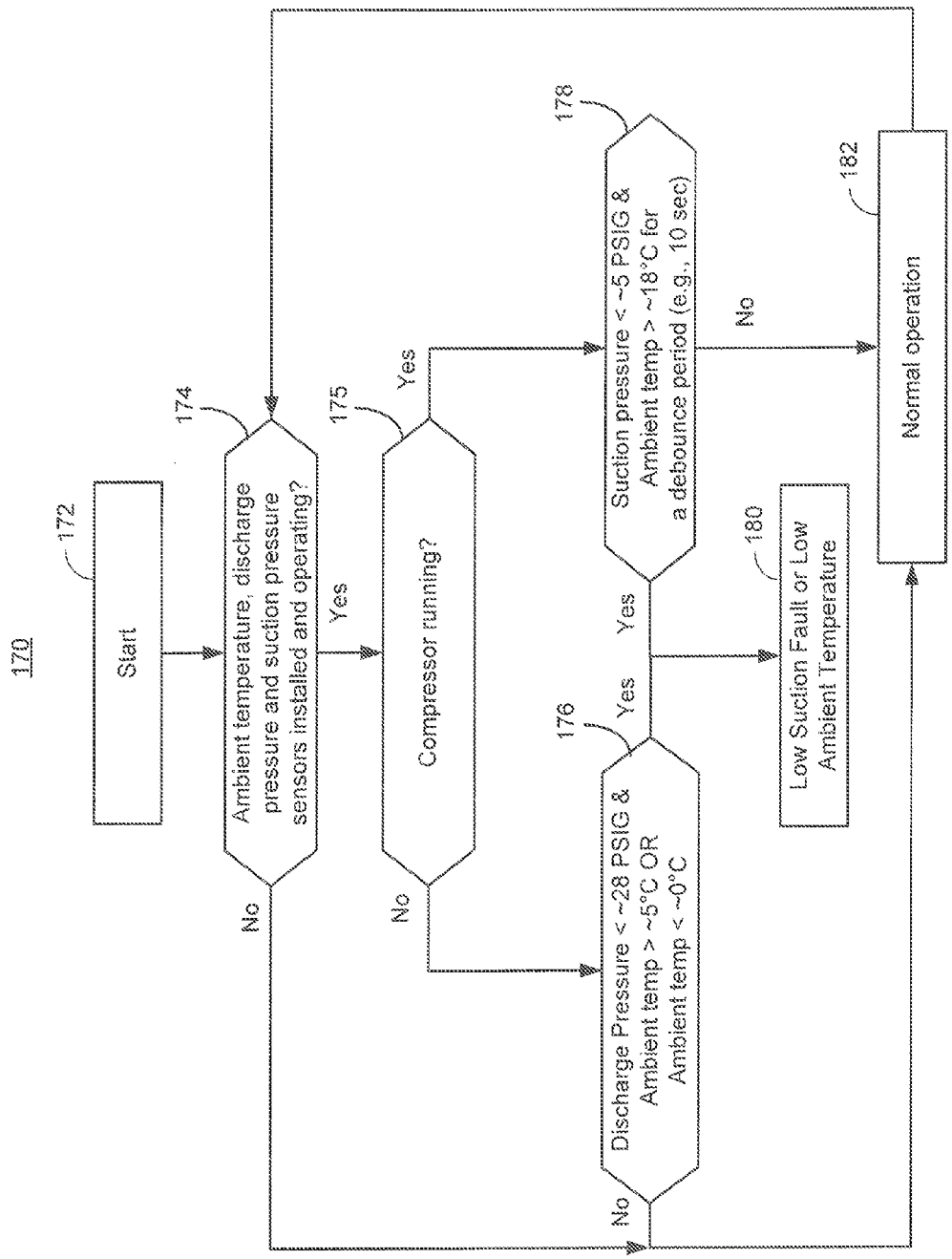
FIG. 5 is a flow chart of an exemplary method of determining a low suction fault.

FIG. 5 is a flow chart of an exemplary method 170 of determining a low suction fault. At system initialization, execution may move from a block 172 to a block 174. At block 174, a determination of the presence and operating status of the ambient temperature sensor 78, the discharge pressure sensor 74, and the suction pressure sensor 76 may be made. If any of the sensors are not installed, or are not operating properly, the "no" branch from block 174 may be taken to block 182 and additional HVAC operations may continue, bypassing the low suction pressure function. Otherwise, the "yes" branch from block 174 may be taken to block 175. At block 175, if the compressor is already running, the 'yes' branch may be taken to block 178 where suction pressure as a function of ambient temperature are checked as described below. If, at block 175 the compressor is not running, the 'no' branch may be followed to block 176.

At block 176, two checks may be performed prior to allowing the compressor to start. First, if the ambient temperature is near or below freezing (~0° C.), compressor operation may be blocked to avoid competition with a heater (not depicted). Second, with respect to refrigerant charge level, the output of pressure sensor 74 may be checked to determine whether it is less than approximately 28 pounds per square inch gauge (PSIG). An ambient temperature as measured at temperature sensor 78 may be checked to determine whether an air temperature is greater than about 5° Celsius (C.). If either condition fails, that is, if the ambient temperature is <5° C. or the discharge pressure is greater than about 28 PSIG, the "no" branch from block 176 may be taken to block 182 and the HVAC unit may be operated normally. If both conditions are true, that is, discharge pressure is less than 28 PSIG and the ambient temperature is greater than 5° C. the "yes" branch may be taken from block 176 to block 180.

At block 180, a low suction fault may be raised indicating a possible low refrigerant level and, as discussed above, an appropriate response may be taken, such as turning off the compressor 52, sending an alarm, etc.

At block 178, suction pressure measured at pressure sensor 76 may be evaluated to determine whether it is less than a compressor minimum effective suction pressure, for example, in an embodiment this may be approximately 5 PSIG or 135 kiloPascals absolute (kPaA). Ambient temperature may be checked to determine whether the ambient temperature is greater than a system specific predetermined temperature, for example, about 18° C. Additionally, if both suction pressure and ambient temperature comparisons are true, a timer (not depicted) may be started to check for system stability. If the conditions of suction pressure being less than about five PSIG and the ambient temperature being greater than about 18° C. persists for 10 seconds or more, the "yes" branch may be taken from block 178 to block 180 and the low suction fault may be asserted. The 10 second time period may be more or less based on specific system and design criteria and current conditions. If at block 178 either condition is not true or if the fault conditions have not persisted for 10 seconds or more, the "no" branch from block 178 may be taken to block 182 and operations continued as normal. From block 182 execution of the control strategy may continue again at block 174. It will be understood that the controller 72 may execute the method 170 in conjunction with other HVAC control strategies and fault detection techniques.

Figure 6:
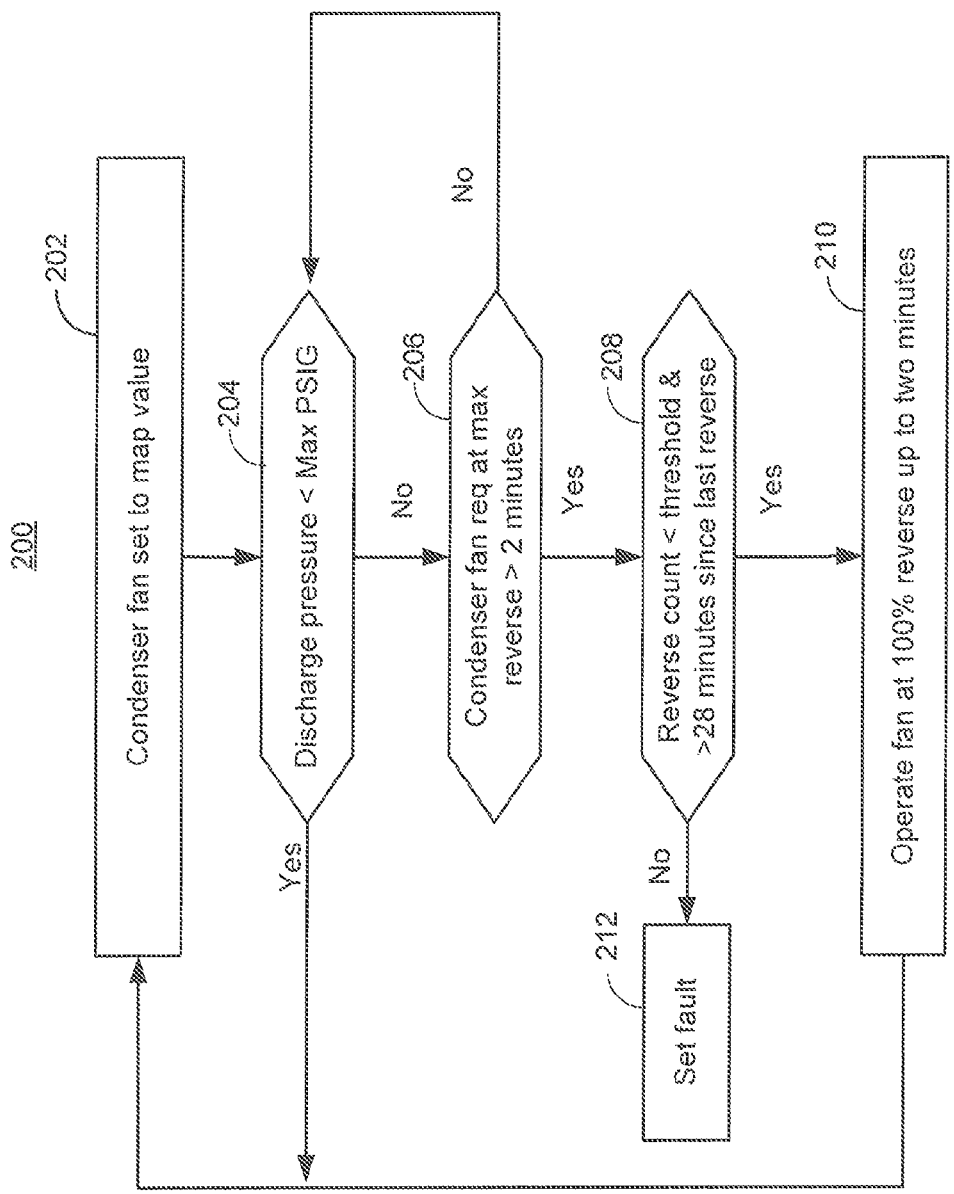
FIG. 6 is a flow chart of an exemplary method of determining condenser fan operation.
Figure 7:
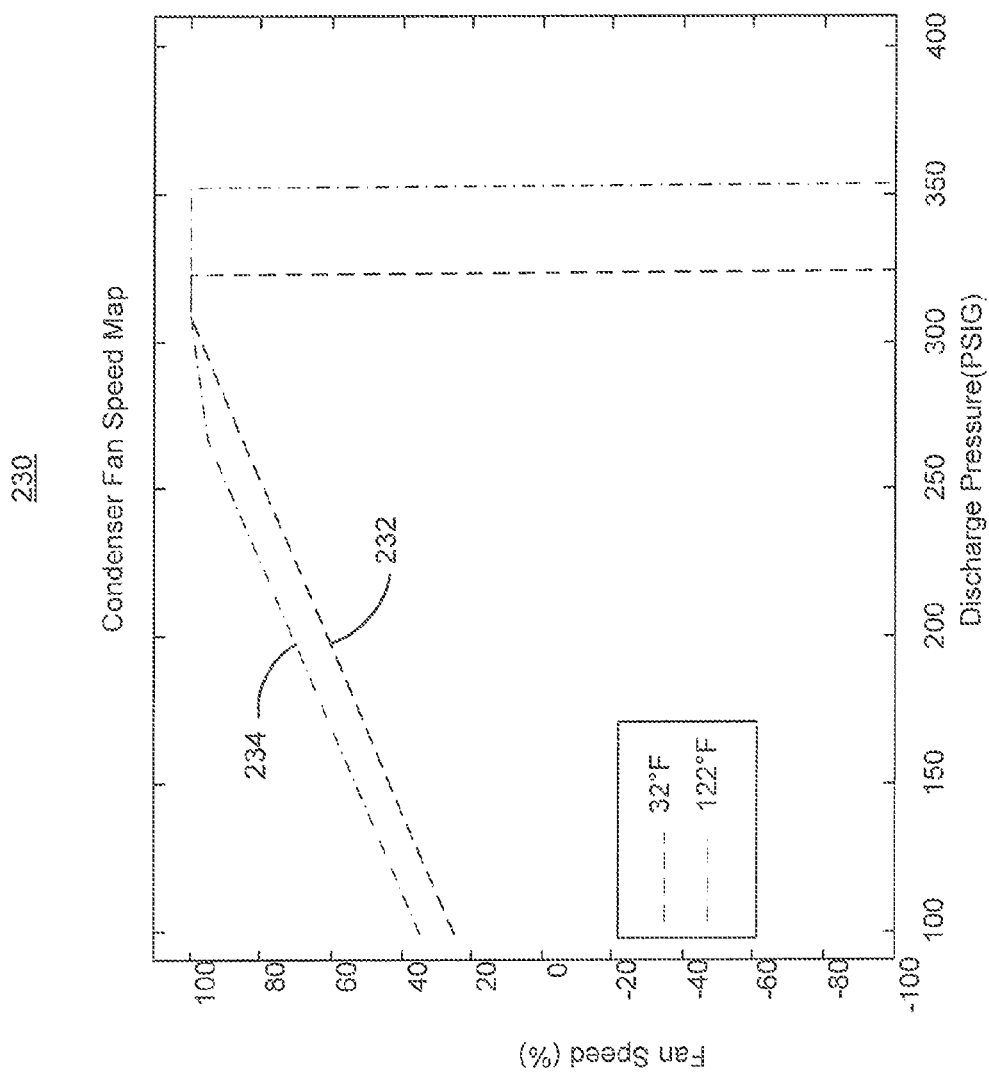
FIG. 7 is an exemplary map of fan speed and direction to compressor discharge pressure.

FIG. 6 is a flow chart of an exemplary method 200 of determining condenser fan operation. At a block 202, the condenser fan 70 may be set to a speed and direction according to an algorithm or predetermined map. Turning briefly to FIG. 7, an exemplary map of fan speed and direction 230 will be discussed in view of the method of FIG. 6.

The map 230 of FIG. 7 illustrates condenser fan speed and direction as a function of compressor discharge pressure. Fan speed is shown is going from −100%, or operation at full reverse, to +100% or operation at full forward. The map 230 further indicates fan speed and direction as a function of ambient temperature. A first plot 232 illustrates fan speed values at 32° F. while plot 234 illustrates fan speed values at 122° F. While only two temperature values are shown for ease of illustration, a plurality of fan speed value by temperature plots may be used in actual practice.

To illustrate use of the map 230, for a given operating condition, such as a discharge pressure of 150 PSIG and an ambient temperature of 32° F., a forward fan speed of ~45% of maximum is indicated. For the same discharge pressure at a temperature of 122° F., a forward fan speed of approximately 55% of maximum is indicated. This follows logically in that a higher heat load is presented during the 122° F. operating condition than at the 32° F. operating condition. At low temperatures the sole function of the HVAC unit 22 may be defogging as opposed to heat removal. Other forward fan speeds are indicated for pressures up to, in this exemplary embodiment, about 310 PSIG where at either temperature the condenser fan 70 is operated at full forward capacity. When discharge pressure reaches approximately 325 PSIG, during operation at 32° F., the condenser fan 70 switches to full reverse operation. Similarly, when operating at 122° F. the full reverse operation of the condenser fan 70 occurs, in this exemplary embodiment, above about 350 PSIG.

Note that in a condition such as progressive clogging of the condenser 70, a continuous rise in compressor discharge pressure results in increasing fan speed until the maximum fan speed is reached. In an embodiment, the controller 72 may check that the fan has been operating at 100% forward capacity for a period of time before setting 100% reverse operation. This strategy may help ensure that a spike in discharge pressure does not prematurely trigger a reverse fan cycle.

While the map 230 is depicted in FIG. 7 as a chart, it is understood that in operation, the functional relationships illustrated between discharge pressure, temperature, and fan direction and speed may be expressed as equations, in a table, or in another known algorithmic sense. Also, the numbers and relationships expressed in the map 230 illustrate an exemplary embodiment and may vary by application based on the equipment, HVAC rating, compressor type, expected operating environment, etc., as would be understood by a person of ordinary skill in the art in view of this disclosure.

To further illustrate an alternate operating strategy, FIG. 8 illustrates another fan speed to discharge pressure map 250 for use at low temperatures, e.g., 32 degrees F. In this embodiment, the fan speed may remain constant at low discharge pressures in a situation where defogging may be the principal interest. By maintaining the fan speed over this low pressure range, the compressor is operated in a high efficiency region, with more continuous operation to reduce clutch operation cycling while preventing overcooling. This allows better matching of system operation to the load and improves reliability by reducing fan speed and cycling.

Returning to FIG. 6, after initially setting the condenser fan speed and direction according to the map discussed above respect to FIG. 6, at block 204 a discharge pressure of the compressor 52 is checked to determine if it has arranged above a maximum pressure threshold. In an embodiment, the maximum pressure may be 425 PSIG. If the discharge pressure is below the maximum pressure threshold the "no" branch from block 204 may be taken to block 206. At block 206, a check is made to see whether the condenser fan 70 has been operating at maximum reverse for more than two minutes. If so, the "yes" branch from block 206 may be taken to block 208. At block 208, a determination may be made if the number of times the condenser fan 70 has been operated in reverse is less than a threshold number and if it has been greater than a predetermined time period since the last request for operation in reverse. The predetermined time may be set to allow for adequate cooling operation and to avoid such frequent reverse operation that it becomes a nuisance at the worksite. If both conditions are true the "yes" branch from block 208 may be taken to block 210 and the condenser fan 70 may be set to operate or continue to operate at 100% reverse. Typically, when the fan is operated at full reverse the compressor 52 is also turned off. If, at block 210, the fan has been operating for two minutes at 100% reverse, the fan may be set to a forward speed, for example 100% forward and the compressor restarted before returning operation to block 202. In the case where the reverse fan operation was successful and enough debris or dirt is removed to restore condenser functionality, at block 202 the condenser fan speed may be set according to the map value. If, however, the condenser remains blocked, the HVAC unit will eventually reach the fault condition at block 212 via repeated passes through block 208.

Returning to block 204, if the compressor discharge pressure is less than a maximum setting for PSIG, for example, 425 PSIG, the "yes" branch from block 204 may be taken to block 210 and the fan operated according to the appropriate map.

Returning to block 206, if the request for condenser fan 70 operation has been in place for less than two minutes the "no" branch from block 206 may be taken to block 204 and operation in reverse may be continued.

Returning to block 208, if the number of times that a request has been made for operation of the condenser fan 70 in reverse exceeds a threshold, for example, 6 times in 24 hours, or if it has been less than 28 minutes since the last request for operation in reverse, the "no" branch from block 208 may be taken to block 212 and a fault may be set. As above, the fault may include stopping the compressor 52, setting an alarm indicator, notifying a monitoring service, etc.

INDUSTRIAL APPLICABILITY

In general, an HVAC unit in earthmoving or other large equipment fills requirements not only for operator comfort but, in the case of window defogging, also provides an essential safety feature. However, operation of the HVAC unit can unnecessarily divert energy from the main earthmoving task, increase operating cost, and expose the equipment owner to costly repairs when the HVAC unit is operated at high discharge pressures or with low refrigerant levels. The use of the disclosed system and methods allow optimizing condenser fan speed in view of heat load and ambient temperature to provide effective cooling while minimizing fan energy. The use of a brushless DC fan allows continuous speed adjustment over a full range of forward and reverse operation to reduce energy consumption by matching the fan speed to operating conditions. Additionally, the system and method allow identification of potential low refrigerant levels to help avoid compressor failure caused by low refrigerant levels. The use of this system and method can, over time, lead to improved equipment availability, lower cost operation, and ultimately, better profitability.

What is claimed is:

1. A heat, ventilation, and air conditioning (HVAC) unit operated in an earthmoving machine, the HVAC unit comprising:
   a compressor that is selectively operable, responsive to a compressor control signal;
   a condenser fluidly coupled to the compressor;
   an expansion valve fluidly coupled to the condenser;
   an evaporator fluidly coupled to the expansion valve and the compressor;
   a first pressure sensor that measures an output pressure of the compressor;
   a second pressure sensor that measures a suction pressure between the expansion valve and the compressor;
   an ambient temperature sensor that measures ambient temperature;
   a condenser fan that provides cooling to the condenser, the condenser fan having variable speed and reversible direction responsive to a condenser fan control signal; and
   a controller electrically coupled to the first pressure sensor, the second pressure sensor, the ambient temperature sensor, and the fan, the controller including:
      a processor;
      a compressor control signal output;
      a condenser fan control signal output;
      a first pressure sensor input coupled to the first pressure sensor;
      a second pressure sensor input coupled to the second pressure sensor;
      an ambient temperature input coupled to the ambient temperature sensor;
      a computer-readable memory that stores instructions that when executed by the processor cause the controller to:
         turn on the compressor via the compressor control signal output based on a request for air conditioning;
         select a condenser fan speed, from condenser fan control data stored in the computer readable memory, responsive to the ambient temperature and the output pressure of the compressor;
         set a speed of the condenser fan to the selected condenser fan speed via the condenser fan control signal;
         send an alarm signal via an alarm output when the suction pressure is less than a threshold suction pressure level and the ambient temperature is above a threshold temperature,
         wherein a direction of the condenser fan is reversed, via the condenser fan control signal output, based on:
            the condenser fan control data indicating a reverse direction based on the ambient temperature and the output pressure of the compressor, and
            a previous reverse operation of the condenser fan occurred outside a minimum reverse cycle time.

2. The HVAC unit of claim 1 wherein the computer-readable memory has further instructions that when executed by the processor, cause the controller to send an alarm signal via the alarm output when the output pressure of the compressor is less than approximately 28 pounds per square in gauge (PSIG) and the ambient temperature is above approximately 5 degrees Celsius.

3. The HVAC unit of claim 1, wherein the computer-readable memory has further instructions that when executed by the processor, cause the controller to turn off the compressor via the compressor control signal output when the suction pressure is less than the threshold suction pressure level and the ambient temperature is above the threshold temperature.

4. The HVAC unit of claim 3, wherein the threshold suction pressure is less than 5 pound per square inch gauge (PSIG) and the ambient temperature is above approximately 18 degrees Celsius for a duration of greater than approximately 8-12 seconds.

5. The HVAC unit of claim 1, wherein the minimum reverse cycle time is in a range of 25 minutes to 30 minutes.

6. A heat, ventilation, and air conditioning (HVAC) unit operated in an earthmoving machine, the HVAC unit comprising:
   a compressor;
   a condenser fluidly coupled to the compressor;
   a condenser fan that provides cooling to the condenser, the condenser fan having variable speed and reversible direction responsive to a condenser fan control signal; and
   a controller electrically coupled to an ambient temperature sensor and the condenser fan, the controller including:
      a processor,
      a compressor control signal output that outputs a compressor signal to control the compressor,
      a condenser fan control signal output that outputs the condenser fan control signal to control the condenser fan,
      an ambient temperature input coupled to an ambient temperature sensor that measures ambient temperature, and
      a computer-readable memory that stores instructions that when executed by the processor cause the controller to:

turn on the compressor via the compressor control signal output based on a request for air conditioning, select a condenser fan speed, from condenser fan control data stored in the computer readable memory, based on the ambient temperature and an output pressure of the compressor, set a speed of the condenser fan to the selected condenser fan speed via the condenser fan control signal, and reverse a direction of the condenser fan is reversed, via the condenser fan control signal output, based on:

the condenser fan control data indicating a reverse direction based on the ambient temperature and the output pressure of the compressor, and a previous reverse operation of the condenser fan occurred outside a minimum reverse cycle time.

7. The HVAC unit of claim 6, further comprising:
an expansion valve fluidly coupled to the condenser,
a second pressure sensor that measures a suction pressure between the expansion valve and the compressor,
wherein the instructions, when executed by the processor, cause the controller to send an alarm signal when the suction pressure is less than a threshold suction pressure level and the ambient temperature is above a threshold temperature.

8. The HVAC unit of claim 7, wherein the instructions, when executed by the processor, cause the controller to turn off the compressor via the compressor control signal output when the suction pressure is less than the threshold suction pressure level and the ambient temperature is above the threshold temperature.

9. The HVAC unit of claim 6, wherein the minimum reverse cycle time is based on maintaining a cooling capacity.

10. The HVAC unit of claim 6, wherein the instructions, when executed by the processor, cause the controller to operate the condenser fan in the reverse direction for a period of time.

11. The HVAC unit of claim 6, further comprising:
a first pressure sensor that measures the output pressure of the compressor,
wherein the instructions, when executed by the processor, cause the controller to send an alarm signal when the output pressure of the compressor is less than a particular pressure and the ambient temperature is above a particular temperature.

12. A controller for a heat, ventilation, and air conditioning (HVAC) unit operated in an earthmoving machine, the controller comprising:
a compressor control signal output operatively coupled to a compressor of the HVAC unit;
a condenser fan control signal output operatively coupled to a condenser fan of the HVAC unit;
a pressure sensor input that receives information regarding an output pressure of the compressor;
a temperature input that receives information regarding ambient temperature;
a processor coupled to the compressor control signal output, the condenser fan control signal output, the first pressure sensor input, and the temperature input; and
a computer-readable memory that stores instructions that when executed by the processor cause the controller to:
turn on the compressor via the compressor control signal output based on a request for air conditioning,
select a condenser fan speed, from condenser fan control data stored in the computer readable memory, based on the ambient temperature and an output pressure of the compressor,
set a speed of the condenser fan to the selected condenser fan speed via the condenser fan control signal,
wherein a direction of the condenser fan is reversed, via the condenser fan control signal output, based on:
the condenser fan control data indicating a reverse direction based on the ambient temperature and the output pressure of the compressor, and
a previous reverse operation of the condenser fan occurred outside a minimum reverse cycle time.

13. The controller of claim 12, further comprising:
another pressure sensor input that receives a suction pressure between an evaporator of the HVAC unit and the compressor,
wherein the instructions, when executed by the processor, cause the controller to turn off the compressor via the compressor control signal output when the suction pressure is less than a threshold suction pressure level and the ambient temperature is above a second threshold temperature.

14. The controller of claim 13, wherein the threshold suction pressure level is a compressor minimum effective suction pressure.

15. The controller of claim 13, wherein the second threshold temperature is an ambient temperature above a particular temperature for a minimum time duration.

16. The controller of claim 12, wherein the minimum reverse cycle period is based on maintaining a cooling capacity.

17. The controller of claim 12, wherein the instructions, when executed by the processor, cause the controller to operate the condenser fan in the reverse direction for a period of time.

* * * * *